United States Patent
Belevich et al.

(10) Patent No.: US 7,222,214 B2
(45) Date of Patent: May 22, 2007

(54) DEVICE-LEVEL ADDRESS TRANSLATION WITHIN A PROGRAMMABLE NON-VOLATILE MEMORY DEVICE

(75) Inventors: Artem Belevich, Sunnyvale, CA (US); Thirumalpathy Balakrishnan, Cupertino, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/090,594

(22) Filed: Mar. 25, 2005

(65) Prior Publication Data

US 2005/0223186 A1 Oct. 6, 2005

Related U.S. Application Data

(60) Provisional application No. 60/556,283, filed on Mar. 25, 2004.

(51) Int. Cl.
*G06F 12/00* (2006.01)
*G06F 15/14* (2006.01)
*G06F 11/00* (2006.01)
*G11C 8/00* (2006.01)

(52) U.S. Cl. .................. 711/103; 711/102; 711/147; 710/305; 714/23; 365/230.03

(58) Field of Classification Search ................ 711/101, 711/147, 102, 103; 710/305; 714/23; 365/230.03
See application file for complete search history.

(56) References Cited

U.S. PATENT DOCUMENTS

| | | | | |
|---|---|---|---|---|
| 4,939,636 A | * | 7/1990 | Nakagawa et al. | ......... 711/147 |
| 5,524,231 A | * | 6/1996 | Brown | ........................ 711/101 |
| 5,559,957 A | * | 9/1996 | Balk | ........................... 714/23 |
| 6,173,360 B1 | * | 1/2001 | Beardsley et al. | ........... 711/111 |
| 6,467,009 B1 | * | 10/2002 | Winegarden et al. | ........ 710/305 |
| 6,868,032 B2 | * | 3/2005 | Kozakai et al. | ......... 365/230.03 |

OTHER PUBLICATIONS

Intel 82801CA I/O Controller Hub 3-S (ICH3-S), Document No. 290733-002, Mar. 2002, p. 234.
"Understanding the Flash Translation Layer (FTL) Specification," Intel Application Note AP-684, Dec. 1998.
"smxFFS Flash File System," Micro Digital, Nov. 18, 2002.

* cited by examiner

*Primary Examiner*—Hyung Souch
*Assistant Examiner*—Mardochee Chery

(57) ABSTRACT

A programmable non-volatile memory device includes block switching logic that enables device-level translation rules to be changed. The device-level translation rules map the external addresses received by the flash memory device to the internal addresses of the programmable non-volatile memory device. Because the device-level translation rules are changeable, the physical location in the programmable non-volatile memory device to which an external address maps can be changed in a manner that is transparent to off-device operations. By allowing device-level translation rules to be changed, block management functions can be accomplished within the programmable non-volatile memory device itself.

20 Claims, 15 Drawing Sheets

Block switching logic

Translation map ─┐ ┌─150

| Changable translation rules ||
|---|---|
| External address (x) | Internal address (y) |
| 0x00000-0x0ffff | 0 |
| 0x10000-0x1ffff | 1 |
| 0x20000-0x2ffff | 2 |
| 0x30000-0x3ffff | 3 |
| ⋮ | ⋮ |
| 0xN0000-0xNffff | N |

Block switching logic
Translation map — 150

Changable translation rules

| External address (x) | Internal address (y) |
|---|---|
| 0x00000-0x0ffff | 1 |
| 0x10000-0x1ffff | 3 |
| 0x20000-0x2ffff | N |
| 0x30000-0x3ffff | O |
| ⋮ | ⋮ |
| 0xN0000-0xNffff | K |

DEVICE-LEVEL ADDRESS TRANSLATION WITHIN A PROGRAMMABLE NON-VOLATILE MEMORY DEVICE

CROSS REFERENCE TO RELATED APPLICATIONS

This application is entitled to the benefit of provisional U.S. patent application Ser. No. 60/556,283, filed 25 Mar. 2004.

FIELD OF THE INVENTION

The invention relates generally to programmable non-volatile memory devices, and more particularly, to techniques for managing data reads and writes within a programmable non-volatile memory device.

BACKGROUND OF THE INVENTION

Programmable non-volatile memory such as flash memory and electronically erasable programmable read only memory (EEPROM) is used in many types of computer systems. For example, programmable non-volatile memory is used in computer systems where space is a premium (e.g., mobile phones, PDAs, digital cameras) and in computer systems where high-reliability is critical (e.g., communications network equipment). A common use of programmable non-volatile memory is to store a boot program for a processor. Programmable non-volatile memory can also be used to store data such as picture files (e.g., in a digital camera flash memory card).

FIG. 1 depicts a block diagram of a computer system that utilizes an operating system 100 and a flash translation layer 102 at the software level 104 and a flash memory device 106 at the hardware level 108. In operation, the operating system includes a file system 110 that identifies addresses for reading and writing to and from the flash memory device. The addresses generated by the operating system, referred to herein as logical addresses, are translated to physical addresses by the flash translation layer. At the hardware level, the physical addresses are referred to as external addresses. Flash translation layer software is described in more detail in the document "Understanding the Flash Translation Layer (FTL) Specification," Application Note AP-684 from INTEL Corporation, December 1998. The flash translation layer can also perform functions such as wear leveling and bad block management. Because the flash translation layer is an entirely software-based element, when the operating system and flash translation layer are not up and running, no translation between logical and physical addresses can be accomplished. Note that flash memory devices are used in many applications without a flash translation layer.

Whether or not a flash translation layer 102 exists, at the hardware level 108, the flash memory device 106 converts an external memory address received on an address bus into an internal address. FIG. 2 depicts a block diagram of a flash memory device 106 that includes an address decoder 112 and programmable non-volatile memory 114 that is logically divided into blocks 116 (e.g., blocks 0, 1, 2, 3 . . . , N). The address decoder includes fixed hardware logic that converts external addresses to internal addresses according to a fixed algorithm. In operation, the address decoder depicted in FIG. 2 receives external addresses from the address bus 118 as part of read and write operations and decodes the external addresses into internal addresses that identify memory blocks within the flash memory device. The relationship between the external addresses and the internal addresses is pre-established and is not changeable. FIG. 3 graphically depicts an example of the fixed relationship between address ranges in the external address space and the memory blocks 116 of the flash memory device 106. As depicted in FIG. 3, the address space 0x0000-0x0ffff corresponds to memory block 0, the address space 0x1000-0x1ffff corresponds to memory block 1, the address space 0x2000-0x2ffff corresponds to memory block 2, the address space 0x3000-0x3ffff corresponds to memory block 3, and the address space 0xN000-0xNffff corresponds to memory block N.

As described above, the flash translation layer 102 is a software-based element that provides address translation between an operating system 100 and a flash memory device 106. While the flash translation layer works well to provide software-level address translation between an operating system and a flash memory device, the flash translation layer is relatively complex software that consumes valuable resources (RAM memory space, processing cycles) in a computer system. Additionally, the functionality provided by the flash translation layer is dependent on software being up and running. In view of this, what is needed is a technique for performing read and write operations within a programmable non-volatile memory device that provides flexibility and that is not dependent on complex flash translation layer software.

SUMMARY OF THE INVENTION

A programmable non-volatile memory device includes block switching logic that enables device-level translation rules to be changed. The device-level translation rules map external addresses received by the flash memory device to internal addresses of the programmable non-volatile memory device. Because the device-level translation rules are changeable, the physical location in the programmable non-volatile memory device to which an external address maps can be changed in a manner that is transparent to off-device operations. By allowing device-level translation rules to be changed, block management functions can be accomplished within the programmable non-volatile memory device itself instead of outside of the programmable non-volatile memory device using, for example, complex flash translation layer software. Because the block management functionality enabled by the block switching logic is not dependent on software such as flash translation layer software, the functionality can be non-volatile and in effect for every memory access, even memory accesses that occur upon execution of the first instruction by a processor after a reset.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 6A is a graphical depiction of a translation map, consisting of a set of changeable translation rules, which identifies the mapping of external address ranges to internal addresses.

FIG. 7A depicts an example of the translation map from FIG. 6A after the translation rules have been changed.

Throughout the description, similar reference numbers may be used to identify similar elements.

DETAILED DESCRIPTION OF THE INVENTION

Figure 1:
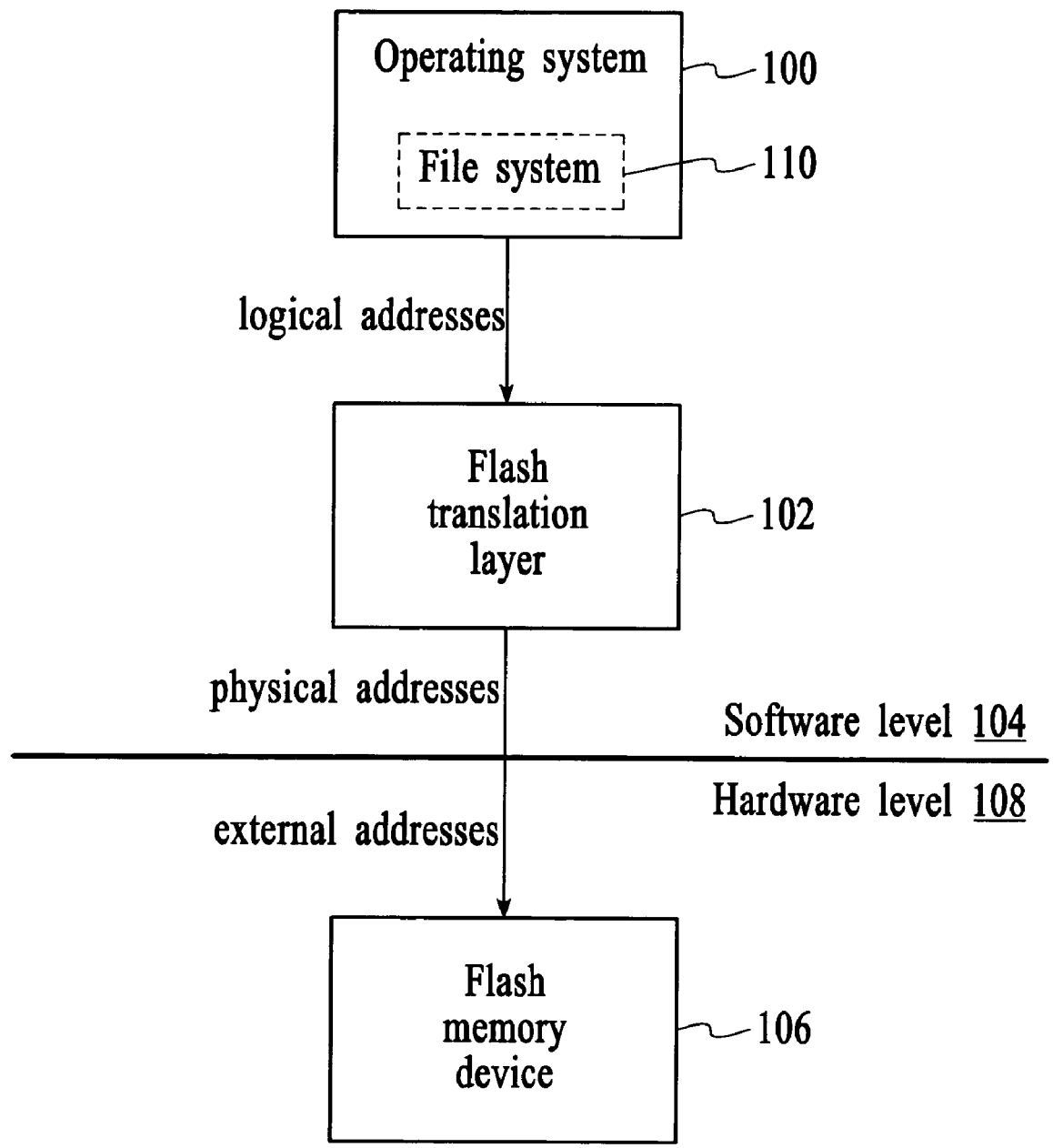
FIG. 1 depicts a block diagram of a prior art computer system that utilizes a flash memory device.
Figure 2:
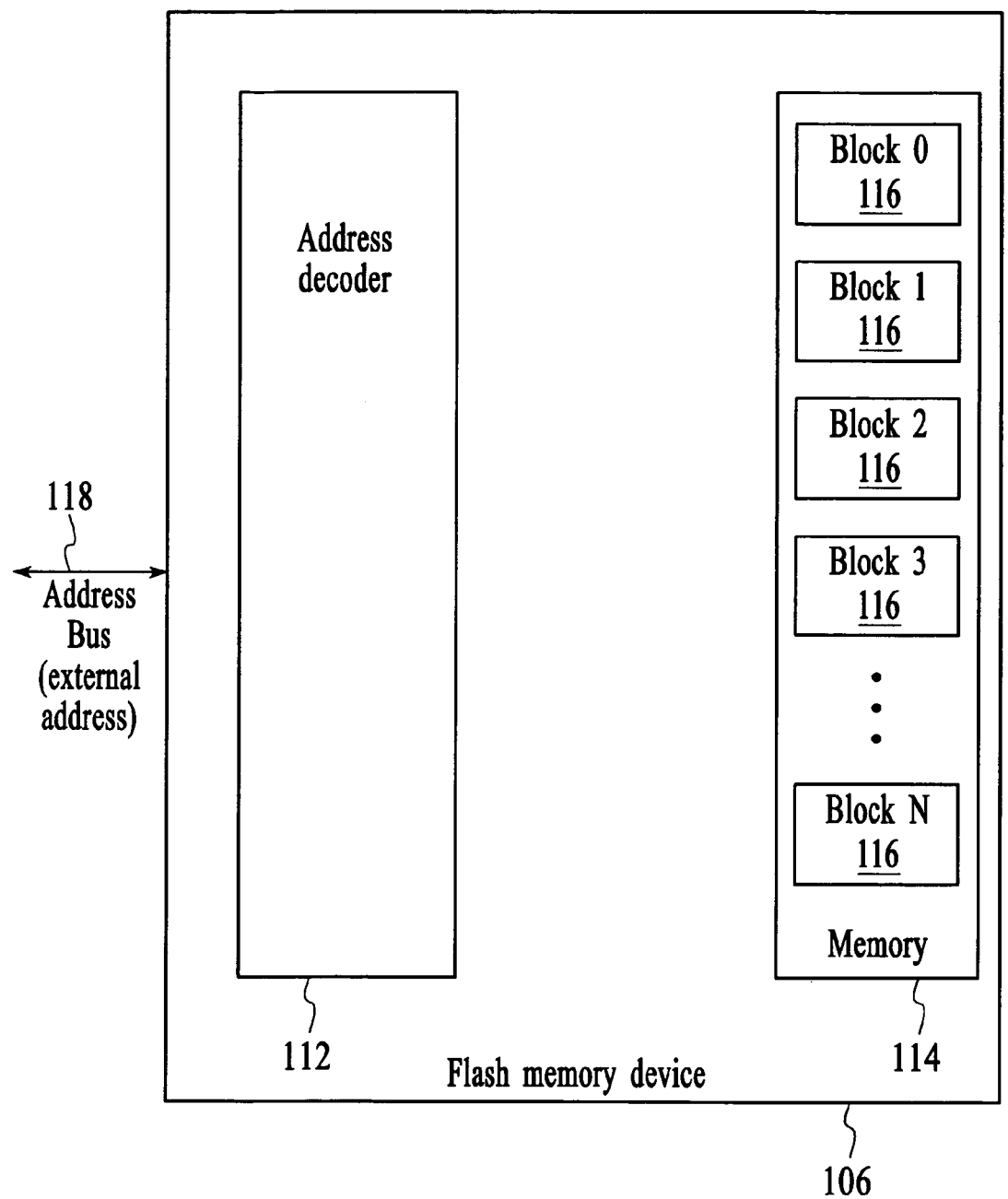
FIG. 2 depicts a block diagram of a prior art flash memory device that includes an address decoder and memory that is logically divided into blocks (e.g., blocks 0, 1, 2, 3 . . . , N).
Figure 3:
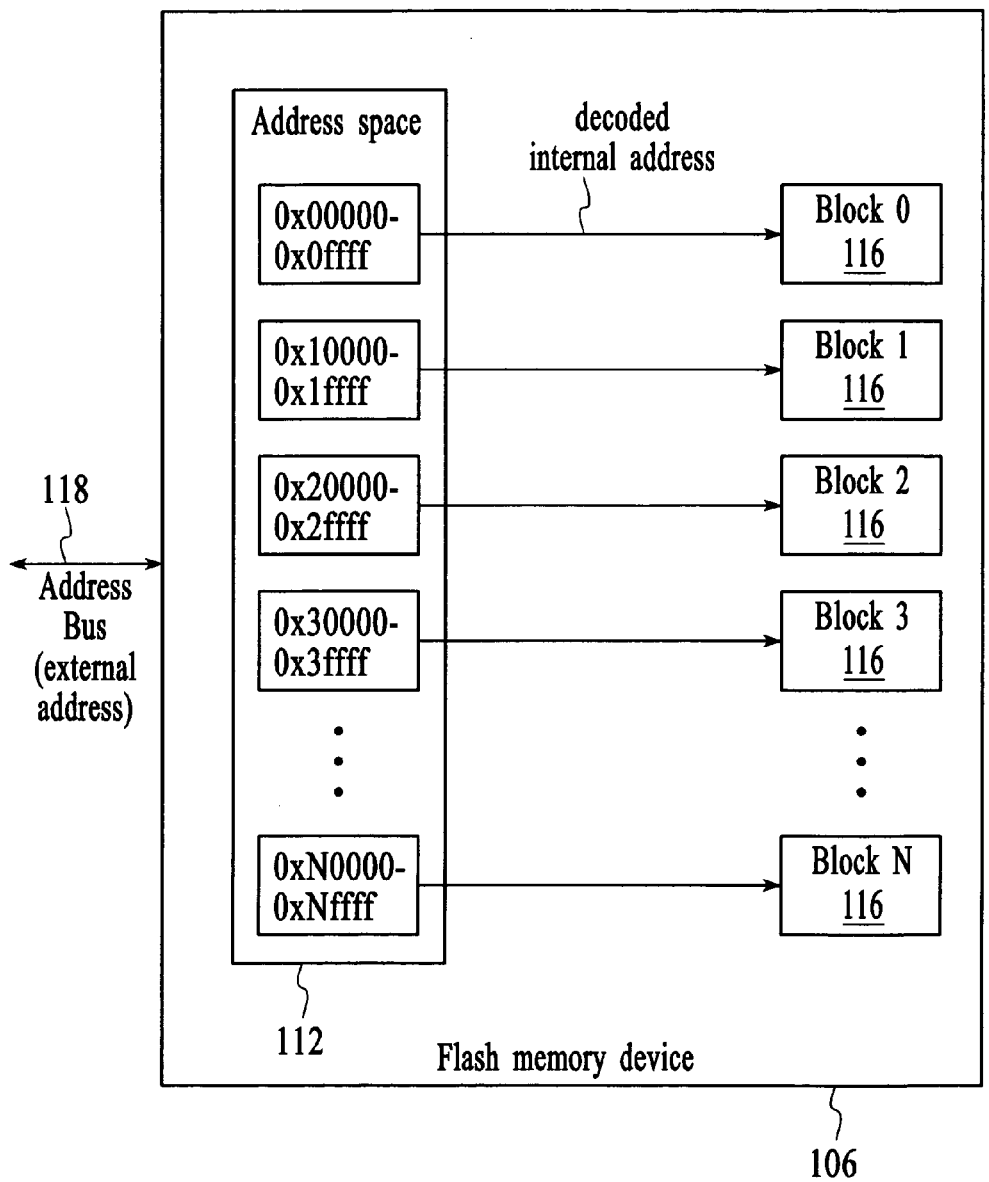
FIG. 3 graphically depicts an example of the fixed relationship between address ranges in the external address space and the memory blocks of the flash memory device of FIG. 2.
Figure 4:
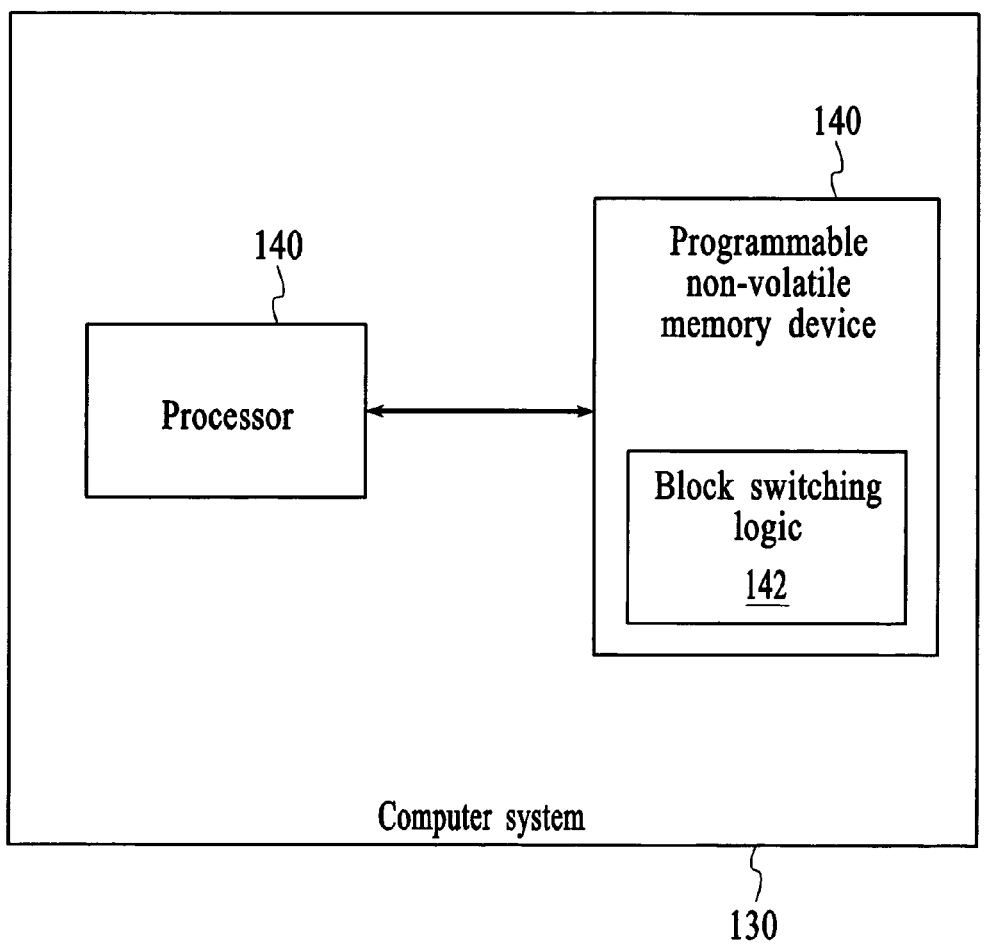
FIG. 4 depicts a block diagram of a computer system that includes a processor and a programmable non-volatile memory device having block switching logic in accordance with an embodiment of the invention.

FIG. 4 depicts a block diagram of a computer system 130 that includes a processor 132 and a programmable non-volatile memory device 140. The processor can be any type of processor from a simple single function processor to a multifunction central processing unit. The programmable non-volatile memory device may be any programmable non-volatile memory device including, for example, a flash memory device, EEPROM, non-volatile RAM, a complex programmable logic device (CPLD), flash-based field programmable gate arrays (FPGAs), and battery-backed RAM. The processor communicates addresses to the programmable non-volatile memory device to control read and write operations. The addresses that are received by the programmable non-volatile memory device are referred to herein as "external addresses" because the addresses are received from an element that is external to the programmable non-volatile memory device.

In accordance with an embodiment of the invention, the programmable non-volatile memory device 140 includes block switching logic 142 that enables device-level translation rules to be changed. The device-level translation rules map the external addresses received by the flash memory device to the internal addresses of the programmable non-volatile memory device. Because the device-level translation rules are changeable, the physical location in the programmable non-volatile memory device to which an external address maps can be changed in a manner that is transparent to off-device operations. By allowing device-level translation rules to be changed, block management functions can be accomplished within the programmable non-volatile memory device itself instead of outside of the programmable non-volatile memory device using, for example, complex flash translation layer software. Because the block management functionality enabled by the block switching logic is not dependent on software such as flash translation layer software, the functionality can be non-volatile and in effect for every memory access, even memory accesses that occur upon execution of the first instruction by the CPU after a reset.

Figure 5:
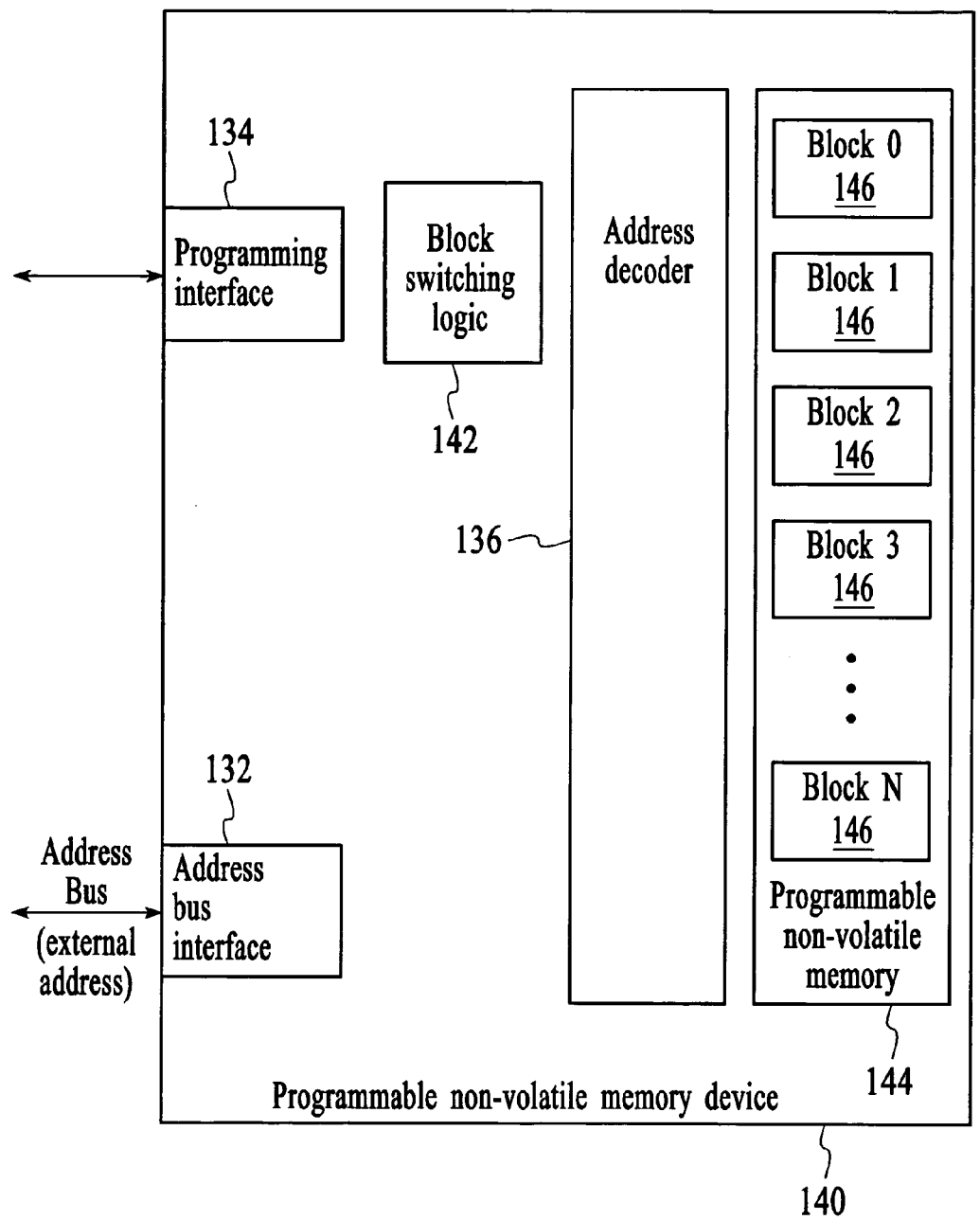
FIG. 5 depicts an expanded view of the flash memory device from FIG. 4.

FIG. 5 depicts an expanded view of the programmable non-volatile memory device 140 from FIG. 4. As depicted in FIG. 5, the programmable non-volatile memory device includes an address bus interface 132, a programming interface 134, block switching logic 142, an address decoder 136, and programmable non-volatile memory 144. The programmable non-volatile memory device may include other interfaces, including data and control interfaces as is known in the field. As depicted in FIG. 5, the programmable non-volatile memory device is logically divided into uniquely identified blocks 146 (e.g., block 0, block 1, block 2, block 3, ... block N). For description purposes, the memory block identifiers and the internal addresses of the memory blocks are the same. That is, memory block 0 has an internal address of 0, memory block 1 has an internal address of 1, etc.

In operation, the address bus interface 132 receives external addresses on the address bus 148 and the address decoder decodes the received external addresses into the corresponding internal addresses. Data is then read to and written from the memory blocks identified by the internal addresses. The block switching logic controls the mapping of the external addresses to the internal addresses and enables device-level translation rules to be changed. As used herein, the terms "translation rule" and "translation rules" refer to whatever function is applied to an external address to identify a corresponding internal address. The translation rules are referred to as "device-level translation rules" because they are not applied outside of the programmable non-volatile memory device. Although the block switching logic is depicted as separate from the address decoder 136 and the programmable non-volatile memory 144, the block switching logic may be partially or wholly integrated with any combination of the address decoder and/or the memory.

Figure 6B:
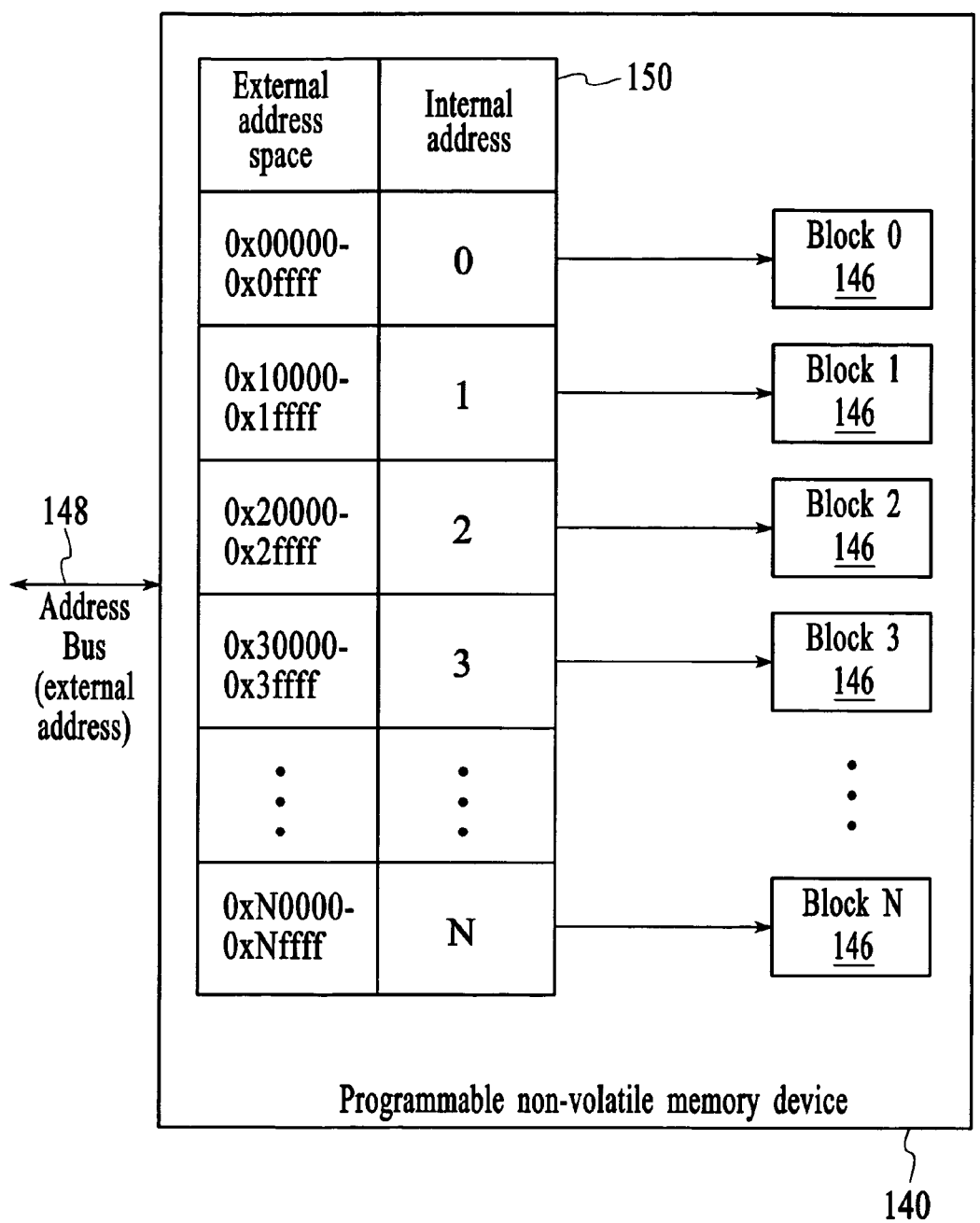
FIG. 6B graphically depicts the relationship between the translation map of FIG. 6A and the memory blocks.

In an embodiment, a set of translation rules is identified as a translation map and the translation map is included as an element of the block switching logic. FIG. 6A is a graphical depiction of a translation map 150, consisting of a set of changeable translation rules, which identifies the mapping of external address ranges to internal addresses. In the example of FIG. 6A, the external address spaces 0x00000-0x0ffff maps to internal address 0, the external address space 0x10000-0x1ffff maps to internal address 1, the external address space 0x20000-0x2ffff maps to internal address 2, the external address space 0x3000-0x3ffff maps to internal address 3, and the external address space 0xN0000-0xNffff maps to internal address N. FIG. 6B graphically depicts the relationship between the translation map 150 of FIG. 6A and the memory blocks 146. Read and write operations occur according to the relationship depicted in FIGS. 6A and 6B.

As described above, the device-level translation rules are changeable. That is, the mapping of the external addresses to the internal addresses can be changed to accomplish a desired result. FIG. 7A is a graphical depiction of the translation map 150 from FIG. 6A after the translation rules have been changed. In the example of FIG. 7A, the external address space of 0x00000-0x0ffff now maps to internal address 1, the external address space 0x10000-0x1ffff now maps to internal address 3, the external address space 0x20000-0x2ffff now maps to internal address N, the external address space 0x30000-0x3ffff now maps to internal address 0, and the external address space 0xN0000-0xNffff now maps to internal address K, where internal address K is some internal address between internal addresses 3 and N.

Figure 7B:
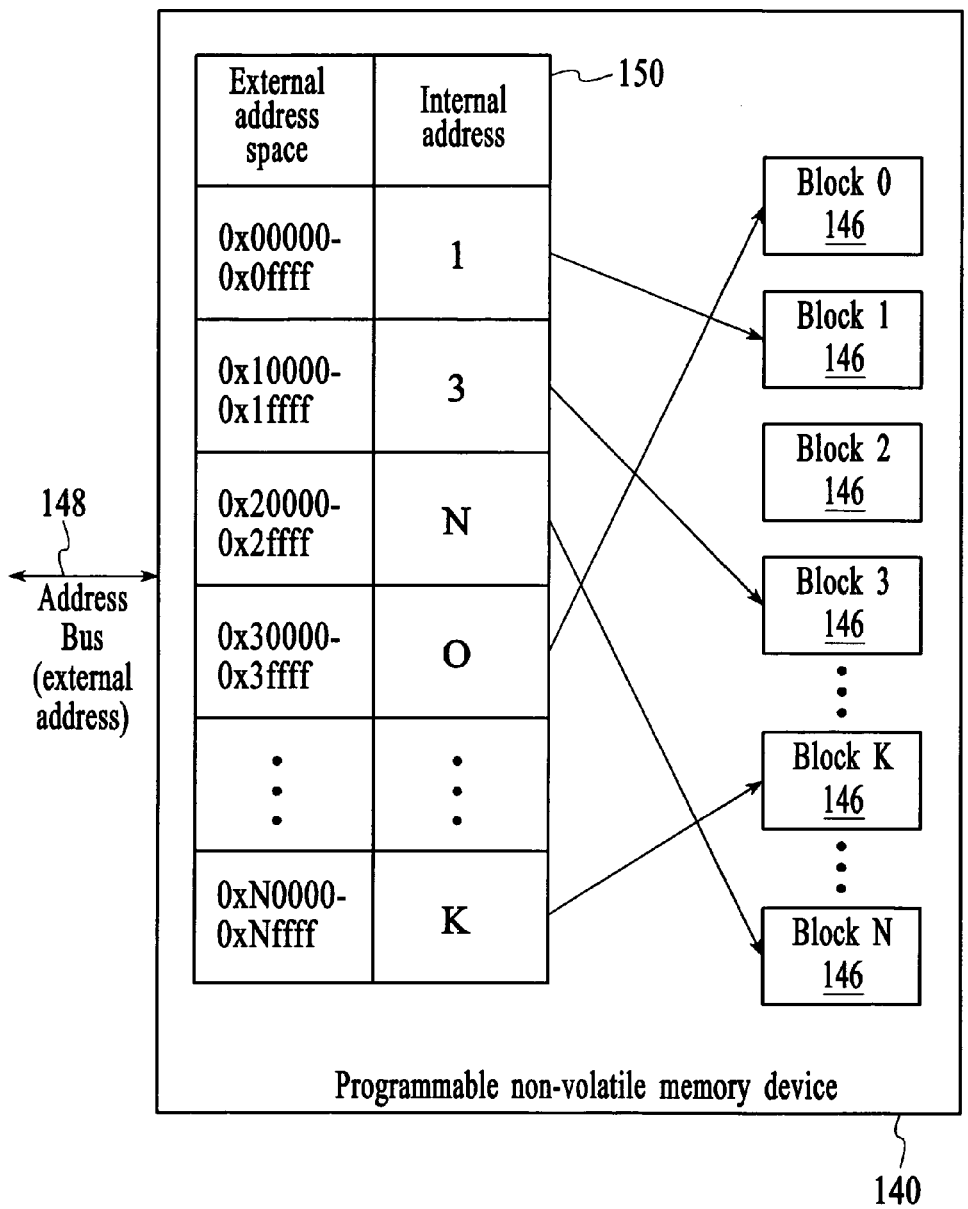
FIG. 7B graphically depicts the relationship between the translation map of FIG. 7A and the memory blocks after the device-level translation rules have been changed.

FIG. 7B graphically depicts the relationship between the translation map 150 of FIG. 7A and the memory blocks 146 after the device-level translation rules have been changed. After the translation rules are changed, read and write operations occur according to the relationship depicted in FIGS. 7A and 7B. As illustrated by comparing FIG. 6B to FIG. 7B, the change in the translation rules causes the external addresses to be mapped to different physical memory blocks in the programmable non-volatile memory device 140. Although all of the translation rules are changed in the above example, any subset of translation rules can be changed at any particular time.

Although the translation rules that map the external addresses to the internal addresses are changeable, the changes are transparent to any elements (including hardware and software elements) that are external to the programmable non-volatile memory device 140. That is, a change in a device-level translation rule only effects operations within the programmable non-volatile memory device and has no effect on the external addresses that are generated and used external to the programmable non-volatile memory device. Further, changes in the device-level translation rules can be implemented as non-volatile changes. That is, changes in the translation rules can be maintained even when the processor is reset and/or when the programmable non-volatile memory device is powered off. When changes in the translation rules are non-volatile, the changed translation rules are in effect immediately upon the very first memory access after a processor reset.

Figure 8:
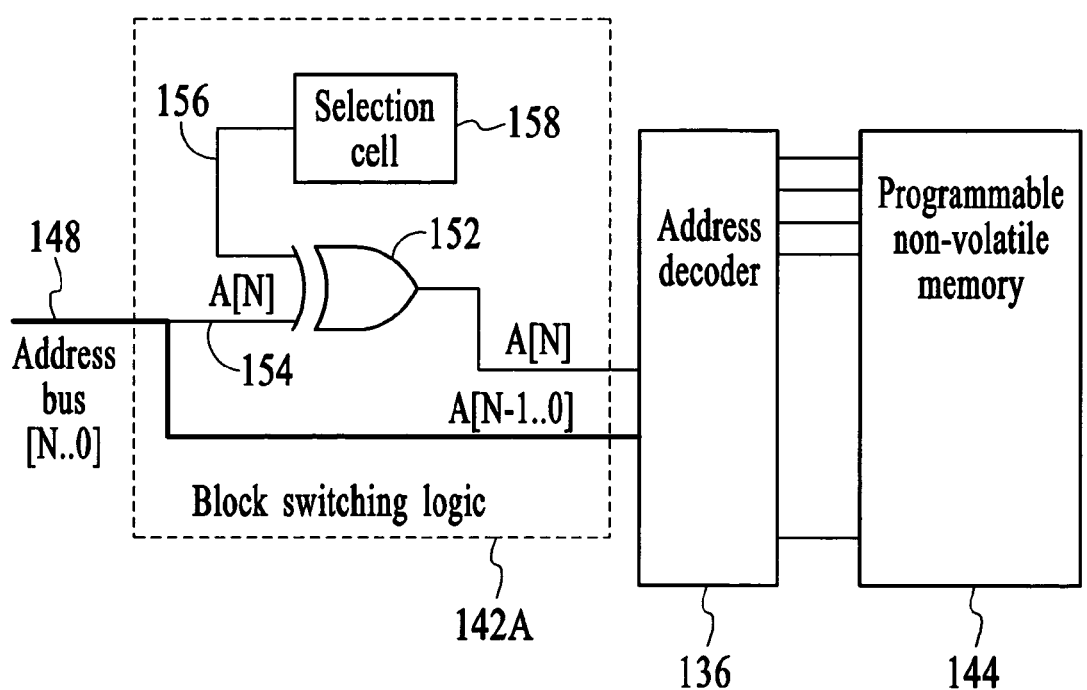
FIG. 8 depicts an embodiment of the block switching logic from FIG. 5.

The block switching logic 142 can be implemented in many different ways to enable device-level translation rules to be changed. The block switching logic may include some function-specific circuitry and may utilize a portion of the programmable non-volatile memory to change the translation rules that are applied to the external addresses. One example embodiment of the block switching logic is depicted in FIG. 8. The block switching logic 142A depicted in FIG. 8 includes a single NOR gate 152 that has one input 154 connected to the most significant bit of the external address and the other input 156 connected to a selection cell 158, which is a portion of the programmable non-volatile memory 144. The selection cell can be a single bit in the programmable non-volatile memory that acts as a binary map switch. By changing the value of the selection cell, one can effectively swap the top and bottom halves of the programmable non-volatile memory device. Note that because the selection cell is part of the programmable non-volatile memory device, the selected translation rule will be unchanged when the system is powered off and then restarted. Although one example embodiment of the block switching logic is described, other embodiments of the block switching logic can be implemented.

The changeable device-level translation rules supported by block switching can be used to implement different functionality. One function that can be implemented through block switching is device-level wear leveling. Device-level wear leveling involves changing the device-level translation rules to more evenly distribute write and erase functions. For example, the translation rules can be periodically changed so that the same external address spaces do not always map to the same internal addresses. The translation rules can be changed according to various different algorithms. The particular algorithm that is used to provide wear leveling is not critical. The device-level wear leveling is transparent to the off-device operations at the software level.

Another function that can be implemented through block switching is device-level bad block management. Device-level bad block management involves changing the device-level translation rules to direct memory read and write operations away from particular memory blocks (e.g., blocks that have failed or have otherwise been identified as bad). Bad block management can be accomplished at the device level totally transparent to off-device operations. The translation rule changes made at the device level to provide wear leveling and bad block management can be non-volatile such that the changes remain in place even in the event of a software crash, a system reset, or a system power off.

Figure 9A:
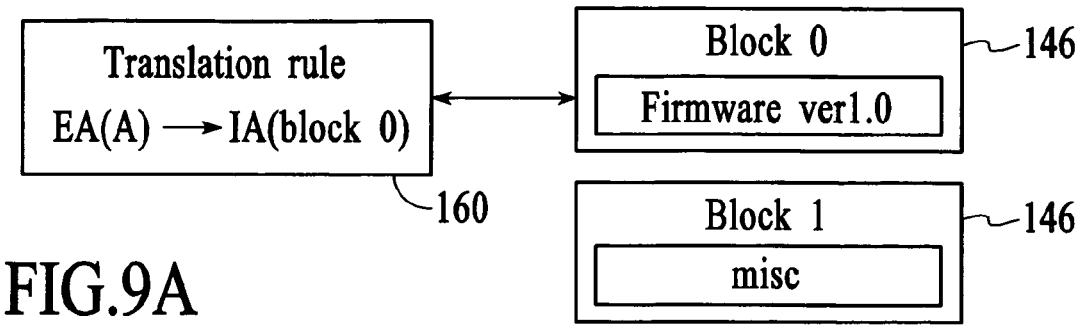
FIGS. 9A–9D illustrate a fault-tolerant firmware upgrade protocol that utilizes block switching.

Firmware is computer code that is stored in programmable non-volatile memory of a computing device. Firmware often includes critical operating code for embedded systems such as (automatic teller machines (ATMs), mobile phones, routers, printers, and PDAs). In many computer systems there is occasionally a need to upgrade the firmware. With mission critical embedded systems (e.g., ATMs and routers) there is a need to provide firmware upgrades that can be implemented quickly and with a high degree of reliability. The ability to change translation rules as described above with reference to FIGS. 4–8 provides an effective mechanism for implementing a fault-tolerant firmware upgrade. An exemplary embodiment in accordance with the invention of a fault-tolerant firmware upgrade protocol that utilizes block switching is described in more detail below with reference to FIGS. 9A–9D. With reference to FIG. 9A, a first translation rule 160 initially applies to external addresses in an address space (e.g., space A). In the example, the address space is reserved for a set of computer code identified as firmware version 1.0 (ver1.0). The applied device-level translation rule maps external addresses in space A to internal address 0 (i.e., block 0). FIG. 9A graphically depicts the mapping of external addresses in space A to block 0 146. FIG. 9A also graphically depicts memory block 1, which includes some miscellaneous information.

Figure 9B:
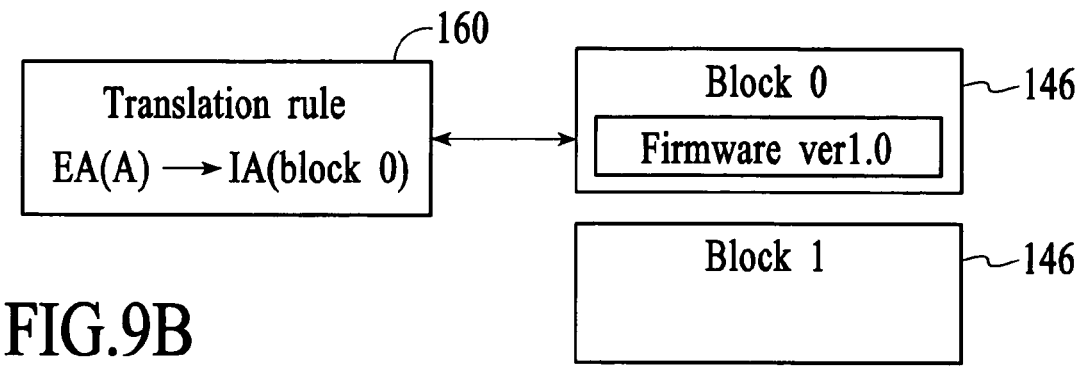

In an embodiment, a first action towards achieving a fault-tolerant firmware upgrade is to erase the block 146 of memory that is to receive the firmware upgrade. The desired block of memory (e.g., block 1) can be erased using techniques that are known in the field of programmable non-volatile memory. FIG. 9B graphically depicts the system of FIG. 9A after the miscellaneous information has been erased from block 1. The erasing step may not be necessary in every case.

Figure 9C:
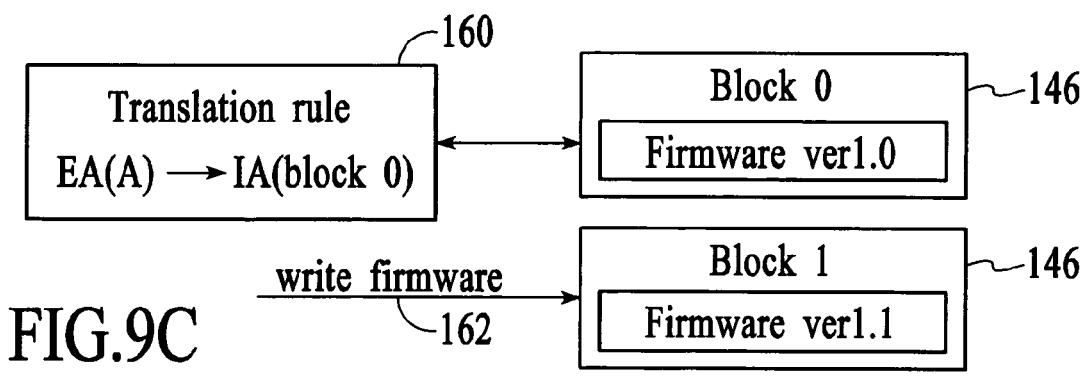

A next action towards achieving a fault-tolerant firmware upgrade involves writing an upgraded version of the firmware (e.g., firmware version 1.1 (ver1.1)) to an available memory block with a different internal address than the memory block that stores the current version of the firmware. FIG. 9C graphically depicts the writing 162 of firmware version 1.1 to block 1 of the flash memory device. Once firmware version 1.1 is completely written to block 1, both versions of the firmware are simultaneously stored in the programmable non-volatile memory device, with version 1.0 being stored in block 0 and version 1.1 being stored in block 1. Note that the translation rule 160 that applies to external addresses in space A has not changed in FIGS. 9A, 9B, and 9C. Specifically, the translation rule maps external addresses in space A to internal address 0. After the upgraded firmware version is written to block 1, in an optional step, the accuracy of the upgraded firmware can be verified.

Figure 9D:
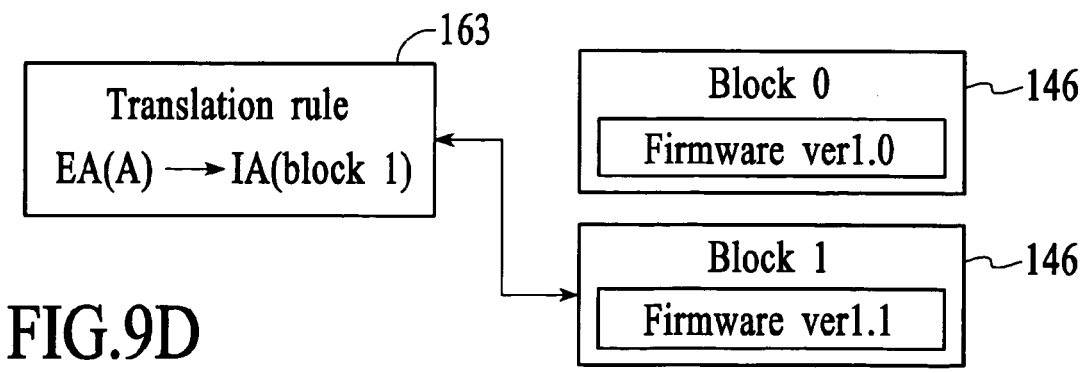

After the firmware version 1.1 is stored and ready, the computer system can be switched from firmware version 1.0 to firmware version 1.1 by simply changing the translation rule that is applied to external addresses in space A. In particular, the translation rule 160 is changed so that external addresses in space A are mapped to block 1 of the programmable non-volatile memory device instead of to block 0. FIG. 9D depicts the change in the translation rule that applies to external addresses in space A. The applied translation rule 163 now maps external addresses in space A to block 1. FIG. 9D also graphically depicts the mapping of external addresses in space A to block 1 instead of to block 0.

In an embodiment, the change from a first translation rule to a second translation rule occurs atomically. An atomic operation is an operation that either completely succeeds or never happens. As applied to a firmware upgrade, in an atomic operation, the switch from one version to the next happens completely with no intermediate steps or it does not happen at all.

Figure 10:
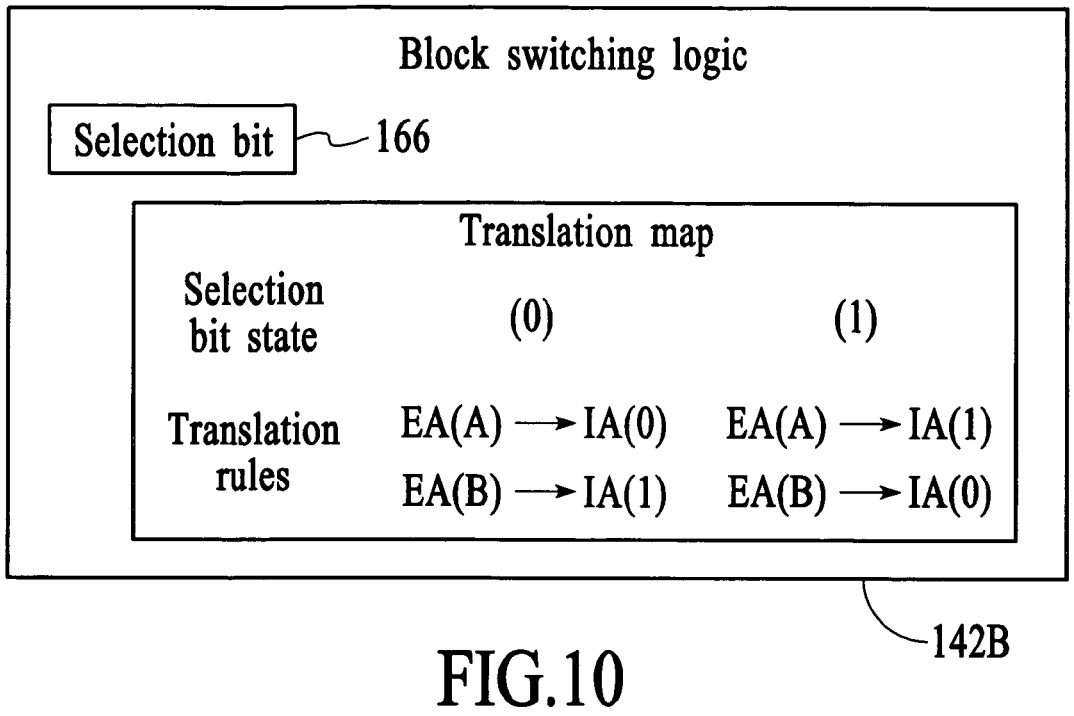
FIG. 10 graphically depicts block switching logic for achieving an atomic change of device-level translation rules.
Figure 11:
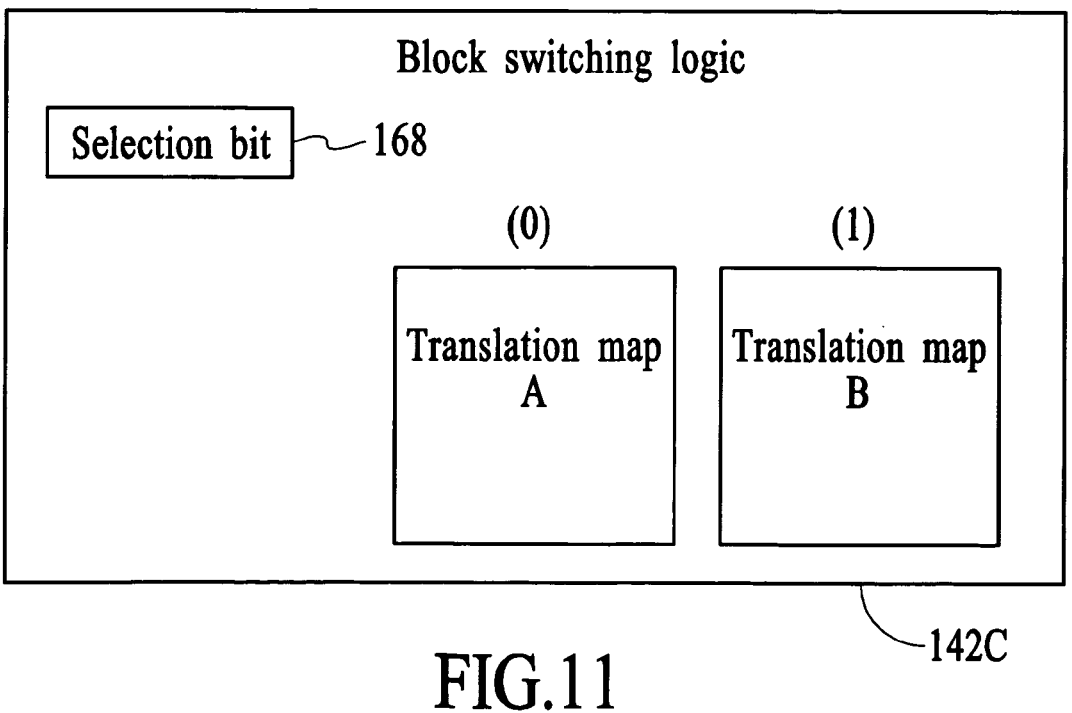
FIG. 11 graphically depicts block switching logic for achieving an atomic change of device-level translation rules.

Whether used for a firmware upgrade or to achieve some other functionality, the change from one translation rule to another is preferably atomic. Two techniques for achieving an atomic change of device-level translation rules are described with reference to FIGS. 10 and 11. FIG. 10 graphically depicts block switching logic 142B for the smallest possible translation map. The block switching logic supports a swap between two blocks of memory. In a first state (e.g., state 0), external address A maps to internal address 0 and external address B maps to internal address 1. In a second state (e.g., state 1), external address A maps to internal address 1 and external address B maps to internal address 0. The state of the translation map is changed atomically by simply changing a selection bit 166 (e.g., from 0 to 1 or from 1 to 0). This functionality can be achieved, for example, using the block switching logic 142A described above with reference to FIG. 8.

Entire translation maps can be upgraded and then changed atomically using a similar approach. Referring to FIG. 10, a selection bit 168 of the block switching logic 142C determines whether translation map A or translation map B is applied to the external addresses. Updating a translation map can be achieved by identifying one of the translation maps (e.g., map A) as the active map and the other map (e.g., map B) as the inactive map, the inactive map is then updated in the background while the active map is in use. After the active translation map is updated, the selection bit can be switched to make translation map B the active translation map and translation map A the inactive map. The atomic switch between translation maps prevents a partially upgraded translation map from being used to identify an internal address. Note that more than one selection bit can be used to identify more selection options. Note also that there are numerous techniques that can be used to achieve atomic changes of device-level translation rules.

The translation rules applied by the address decoder of a programmable non-volatile memory device can be externally and/or internally controlled. External control is initiated from a source that is external to the flash memory device and may involve application-generated changes or user-generated changes that are applied through a programming interface 134. Application-generated changes may be initiated, for example, by a software-based wear-leveling application while user-generated changes may be initiated by a user through a user interface. Internal control is initiated from within the flash memory device and may involve, for example, device-level logic that is embedded into the flash memory device. In an embodiment, device-level function-specific logic may be incorporated into the block switching logic of the flash memory device to control changes in translation rules. The device-level function-specific logic may include internal algorithms to implement block management functionality, including, for example, wear leveling and/or bad block management.

Figure 12:
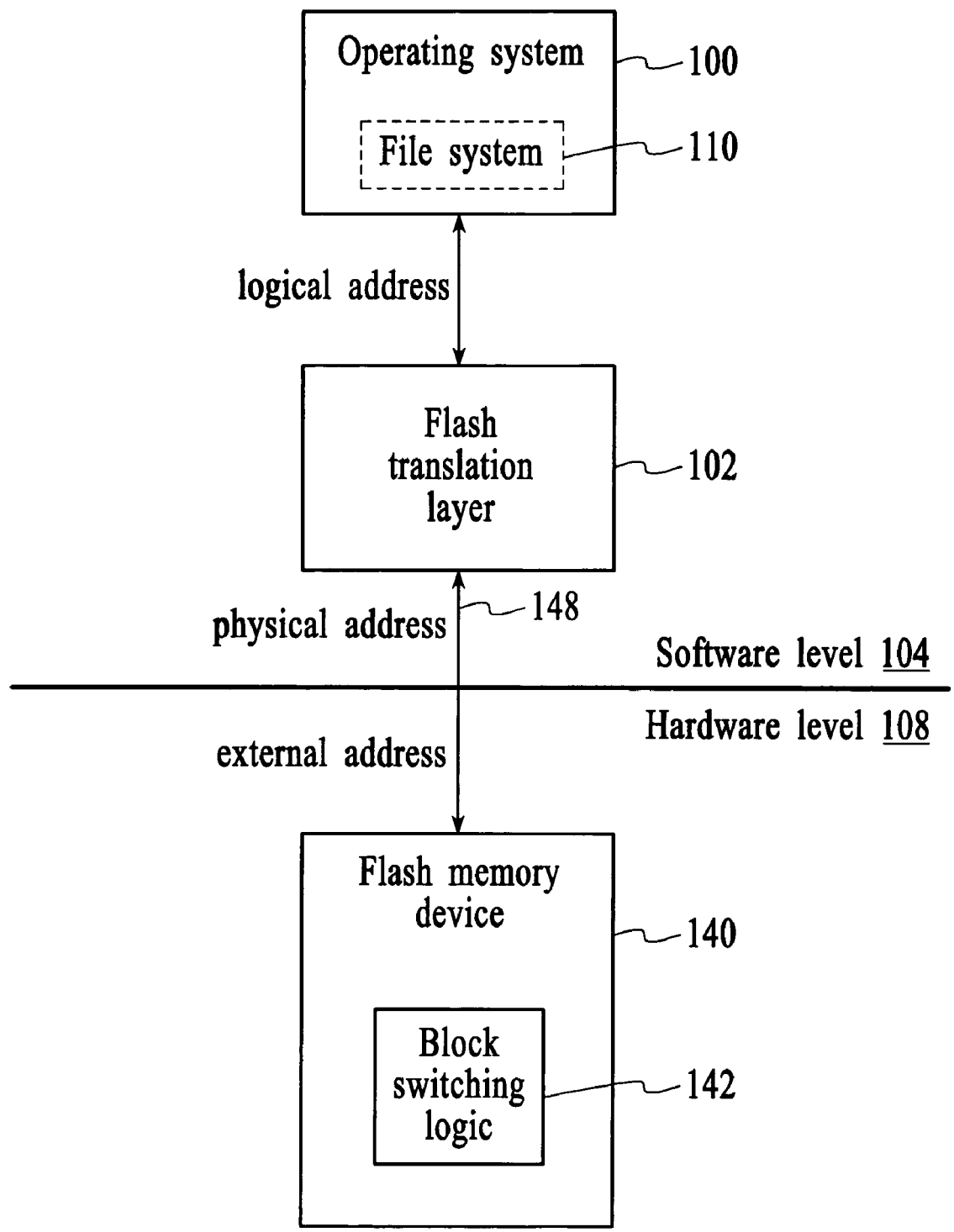
FIG. 12 depicts a block diagram of a computer system that utilizes a flash memory device with block switching logic in accordance with an embodiment of the invention.

FIG. 12 depicts a block diagram of a computer system that utilizes an operating system 100 and a flash translation layer 102 at the software level 104 and a flash memory device 140 at the hardware level 108. The computer system also includes a central processing unit (CPU) at the hardware level (not shown) that supports operations of the operating system and the flash translation layer. The operating system includes a file system 110 that identifies memory addresses for memory read and memory write operations. The memory addresses identified by the operating system, referred to in FIG. 12 as logical addresses, are communicated to the flash translation layer. In an embodiment, the logical addresses are 16 or 32-bit addresses as is known in the field. The logical addresses are converted to physical addresses by the flash translation layer. The flash translation layer communicates physical addresses to the flash memory device via an address bus. When describing operations of the flash memory device, the physical addresses that are received by the flash memory device are referred to as "external addresses" because the addresses are received from an element that is external to the flash memory device. In the example of FIG. 12, an external address is an address that is received by the flash memory device via the address bus. As described above, the flash memory device includes block switching logic 142 that enables device-level translation rules to be changed. FIG. 12 is a presented to emphasize that the subject matter of the invention relates to changing translation rules at the programmable non-volatile memory device level and not at the software level. In accordance with the invention, the changing of device-level translation rules is completely transparent to the file system and flash translation layer that are external to the flash memory device. That is, changes in device-level translation rules only effect operations within the flash memory device and have no effect on operations at the software level.

Figure 13:
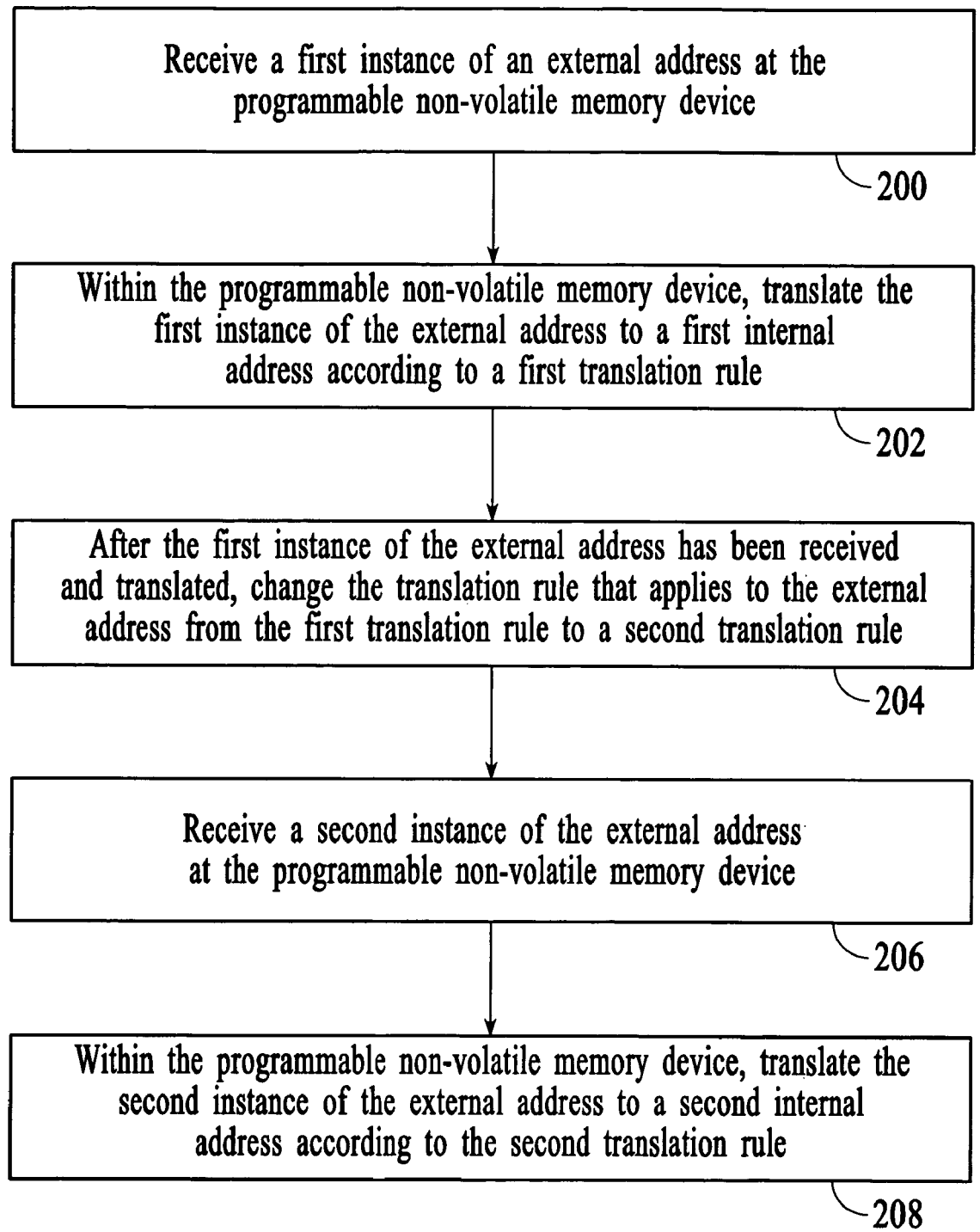
FIG. 13 depicts a process flow diagram of a method for performing read and write operations in a programmable non-volatile memory device.

FIG. 13 depicts a process flow diagram of a method for performing read and write operations in a programmable non-volatile memory device. At block 200, a first instance of an external address is received at the programmable non-volatile memory device. At block 202, within the programmable non-volatile memory device, the first instance of the external address is translated to a first internal address according to a first translation rule. At block 204, after the first instance of the external address has been received and translated, the translation rule that applies to the external address is changed from the first translation rule to a second translation rule. At block 206, a second instance of the external address is received at the programmable non-volatile memory device. At block 208, within the programmable non-volatile memory device, the second instance of the external address is translated to a second internal address according to the second translation rule.

Figure 14:
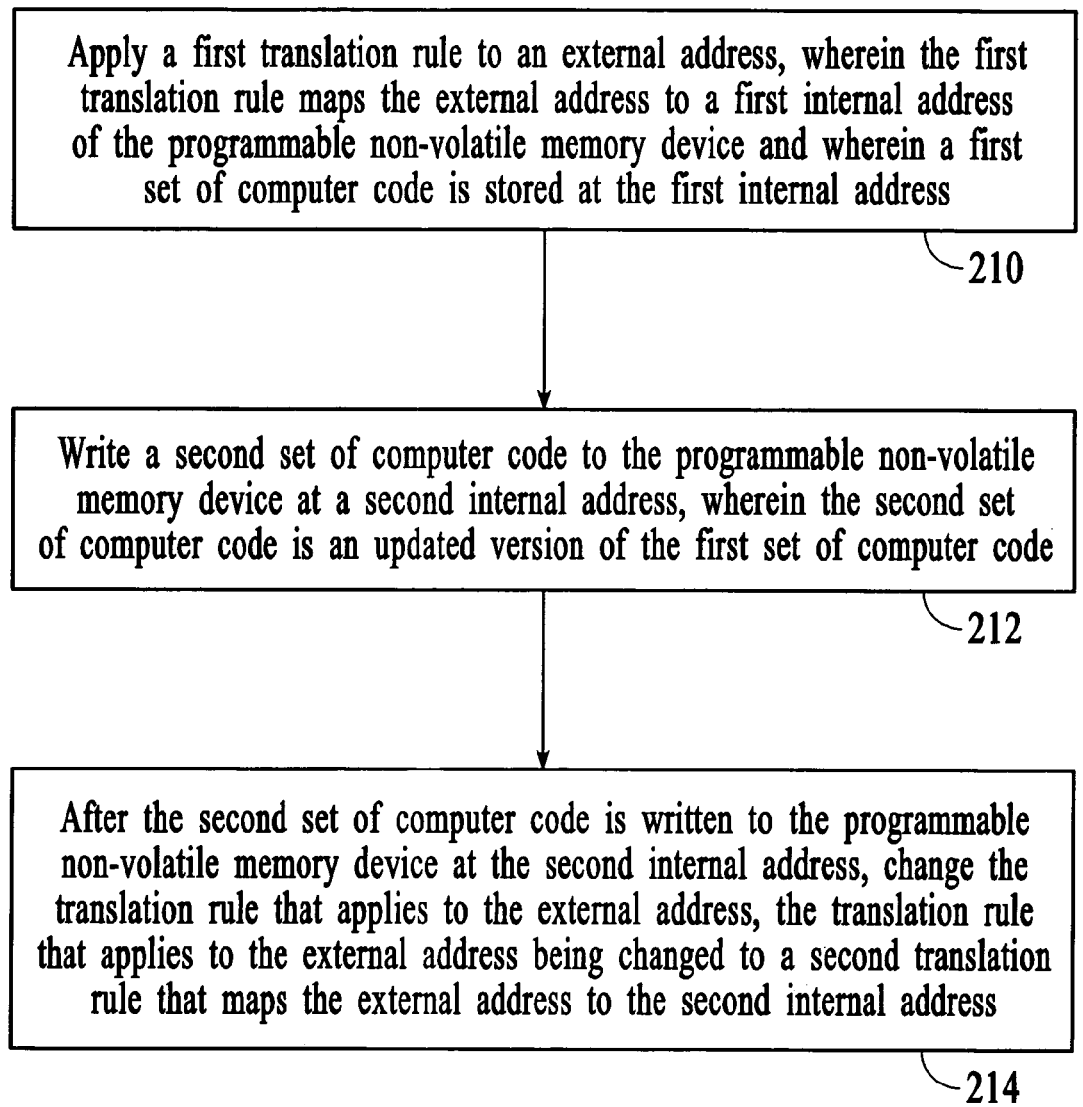
FIG. 14 depicts a process flow diagram of a method for performing a firmware upgrade in a programmable non-volatile memory device.

FIG. 14 depicts a process flow diagram of a method for performing a firmware upgrade in a programmable non-volatile memory device. At block 210, a first translation rule is applied to an external address, wherein the first translation rule maps the external address to a first internal address of the programmable non-volatile memory device and wherein a first set of computer code is stored at the first internal address. At block 212, a second set of computer code is written to the programmable non-volatile memory device at a second internal address, wherein the second set of computer code is an updated version of the first set of computer code. At block 214, after the second set of computer code is written to the programmable non-volatile device at the second internal address, the translation rule that applies to the external address is changed, the translation rule that applies to the external address being changed to a second translation rule that maps the external address to the second internal address.

Although the programmable non-volatile memory devices are described as being logically divided into memory "blocks," the programmable non-volatile memory devices can be logically divided into any logical elements (e.g., cells, pages, blocks, etc.) that can be uniquely identified by internal addresses.

Although specific embodiments of the invention have been described and illustrated, the invention is not to be limited to the specific forms or arrangements of parts as described and illustrated herein. The invention is limited only by the claims.

What is claimed is:

1. A programmable non-volatile memory device comprising:
   programmable non-volatile memory having blocks that are identified by internal addresses;
   an address bus interface configured to receive external addresses as part of read and write operations; and
   block switching logic operatively associated with the programmable non-volatile memory and the address bus interface and configured to enable a translation rule that applies to an external address to be changed from a first translation rule that maps the external address to a first internal address to a second translation rule that maps the external address to a second internal address, wherein the first translation rule is different from the second translation rule; and
   wherein the block switching logic includes a selection cell, which is a portion of the programmable non-volatile memory, and wherein the applied translation rule is changed from the first translation rule to the second translation rule by changing at least one bit of the selection cell.

2. The programmable non-volatile memory device of claim 1 wherein the block switching logic includes a programming interface configured to enable changing from the first translation rule to the second translation rule.

3. The programmable non-volatile memory device of claim 1 wherein the block switching logic is configured to produce a non-volatile change from the first translation rule to the second translation rule.

4. The programmable non-volatile memory device of claim 1 wherein the block switching logic includes means for atomically switching from the first translation rule to the second translation rule.

5. The programmable non-volatile memory device of claim 4 wherein the means for atomically switching comprises at least one non-volatile selection bit, the at least one non-volatile selection bit being a bit in a programmable non-volatile memory that is unchanged when the programmable memory is powered off and then restarted.

6. The programmable non-volatile memory device of claim 1 wherein the block switching logic includes multiple different translation maps, and wherein the block switching logic is configured to utilize only one of the multiple translation maps at any one time.

7. The programmable non-volatile memory device of claim 1 wherein the block switching logic includes a translation map that includes multiple changeable translation rules.

8. The programmable non-volatile memory device of claim 1 wherein the block switching logic includes a portion of the programmable non-volatile memory to store at least two translation maps.

9. A method for performing read and write operations in a programmable non-volatile memory device, wherein memory addresses for read and write operations are identified external to the programmable non-volatile memory device by external addresses and internal to the programmable non-volatile memory device by internal addresses, the method comprising:
   receiving a first instance of an external address at the programmable non-volatile memory device;
   within the programmable non-volatile memory device, translating the first instance of the external address to a first internal address according to a first translation rule;
   after the first instance of the external address has been received and translated, changing the translation rule that applies to the external address from the first translation rule to a second translation rule, wherein the first translation rule is different from the second translation rule, and wherein changing the applied translation rule comprises changing at least one bit of a selection cell, wherein the selection cell is a portion of the programmable non-volatile memory device;
   receiving a second instance of the external address at the programmable non-volatile memory device; and
   within the programmable non-volatile memory device, translating the second instance of the external address to a second internal address according to the second translation rule.

10. The method of claim 9 wherein the translation rule that applies to the external address is changed by switching at least one selection bit within the programmable non-volatile memory device, the at least one non-volatile selection bit being a bit in the selection cell that is unchanged when the programmable memory is powered off and then restarted.

11. The method of claim 9 wherein the change in translation rules is non-volatile.

12. The method of claim 9 wherein the translation rule that applies to the external address is changed atomically from the first translation rule to the second translation rule.

13. The method of claim 9 further comprising atomically changing from a first set of translation rules to a second set of translation rules.

14. A method for performing a firmware upgrade in an embedded system that includes a programmable non-volatile memory device, wherein memory addresses for read and write operations are identified external to the programmable non-volatile memory device by external addresses and internal to the programmable non-volatile memory device by internal addresses, the method comprising:
   applying a first translation rule to an external address, wherein the first translation rule maps the external address to a first internal address of the programmable non-volatile memory device and wherein a first set of computer code is stored at the first internal address;

writing a second set of computer code to the programmable non-volatile memory device at a second internal address, wherein the second set of computer code is an updated version of the first set of computer code;

after the second set of computer code is written to the programmable non-volatile device at the second internal address, changing the translation rule that applies to the external address, the translation rule that applies to the external address being changed to a second translation rule that maps the external address to the second internal address, wherein the first translation rule is different from the second translation rule, and wherein changing the translation rule that applies to the external address comprises changing at least one bit of a selection cell, wherein the selection cell is a portion of the programmable non-volatile memory device.

15. The method of claim 14 wherein changing the translation rule that applies to the external address comprises making a non-volatile change within the programmable non-volatile memory device.

16. The method of claim 14 wherein changing the translation rule that applies to the external address comprises atomically changing from the first translation rule to the second translation rule.

17. The method of claim 14 further including erasing the memory at the second internal address before the second set of computer code is written.

18. The programmable non-volatile memory device of claim 1 wherein the block switching logic includes a logic gate having an input that is connected to the selection cell and wherein the logic gate is configured to perform address translation from an external address to an internal address.

19. The method of claim 9 wherein changing the applied translation rule comprises providing an input to an address translation logic gate from the selection cell.

20. The method of claim 14 wherein changing the applied translation rule comprises providing an input to an address translation logic gate from the selection cell.

* * * * *